(12) United States Patent
Chapman et al.

(10) Patent No.: US 8,310,718 B2
(45) Date of Patent: Nov. 13, 2012

(54) HIGH RESOLUTION SCALABLE GLOSS EFFECT

(75) Inventors: Edward Chapman, Rochester, NY (US); Reiner Eschbach, Webster, NY (US); Shen-Ge Wang, Fairport, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 912 days.

(21) Appl. No.: 12/404,877

(22) Filed: Mar. 16, 2009

(65) Prior Publication Data

US 2010/0231980 A1 Sep. 16, 2010

(51) Int. Cl.
*H04N 1/60* (2006.01)
*H04N 1/40* (2006.01)

(52) U.S. Cl. ........ 358/1.9; 358/3.01; 358/3.1; 358/3.28; 358/518; 358/521

(58) Field of Classification Search .................... 358/1.9, 358/3.03, 3.06, 3.28; 382/100
See application file for complete search history.

(56) References Cited

U.S. PATENT DOCUMENTS

| | | | |
|---|---|---|---|
| 4,033,059 A | 7/1977 | Hutton et al. | |
| 5,737,088 A * | 4/1998 | Coleman | 358/296 |
| 5,754,302 A * | 5/1998 | Coleman | 358/296 |
| 5,960,163 A | 9/1999 | Nickell et al. | |
| 6,584,479 B2 * | 6/2003 | Chang et al. | 715/205 |
| 7,092,128 B2 | 8/2006 | Wang et al. | |
| 7,126,721 B2 | 10/2006 | Wang et al. | |
| 7,148,999 B2 | 12/2006 | Xu et al. | |
| 7,301,675 B2 * | 11/2007 | Wang et al. | 358/3.06 |
| 7,794,077 B2 * | 9/2010 | Falser et al. | 347/104 |
| 8,150,280 B2 * | 4/2012 | Omata | 399/45 |

(Continued)

FOREIGN PATENT DOCUMENTS

WO WO 2006/013352 2/2006

OTHER PUBLICATIONS

European Search Report mailed Jun. 28, 2010 for Application No. EP 10 15 6646.

*Primary Examiner* — Richard Zhu
(74) *Attorney, Agent, or Firm* — Fay Sharpe LLP

(57) ABSTRACT

A method for defining a gloss effect in a printed document includes printing a document region with first and second colorant combinations. The first colorant combination defines a first colorant stack height and said second colorant combination defines a second colorant stack height that differs from the first colorant stack height. As such, the document region has a first appearance when viewed straight-on and a second appearance when viewed at an angle. In one example, the first colorant combination is black (K) colorant that results in a one-level stack height and the second colorant combination is cyan, magenta, and yellow (CMY) colorants that result in a three-level stack height. In another example, the second colorant combination can be cyan, magenta, yellow and black (CMYK) colorants that define a four-level stack height. In such case, both colorant combinations appear as black in straight-on viewing or scanning, while the average color and/or luminance of the colorant combinations will differ from each other when the document region is viewed at an oblique angle. The desired gloss font or other gloss effect is defined by selective placement of the first and second colorant combinations relative to each other. Font sizes of 3 points or less can be defined.

4 Claims, 5 Drawing Sheets

U.S. PATENT DOCUMENTS

| | | |
|---|---|---|
| 2003/0231349 A1 | 12/2003 | Wang et al. |
| 2004/0114160 A1 | 6/2004 | Wang et al. |
| 2005/0068550 A1* | 3/2005 | Braun .................... 358/1.9 |
| 2005/0128523 A1 | 6/2005 | Liu et al. |
| 2005/0240549 A1 | 10/2005 | Adamczyk et al. |
| 2006/0072159 A1 | 4/2006 | Eschbach et al. |
| 2006/0127117 A1 | 6/2006 | Eschbach et al. |
| 2007/0139680 A1 | 6/2007 | Eschbach et al. |
| 2007/0139681 A1 | 6/2007 | Eschbach et al. |
| 2007/0268511 A1 | 11/2007 | Crichton et al. |
| 2009/0174908 A1* | 7/2009 | Asai ..................... 358/3.06 |
| 2010/0037326 A1* | 2/2010 | Batistatos et al. .......... 726/34 |

\* cited by examiner

| C+Y | C+Y | C   | C+Y | C+Y |
|-----|-----|-----|-----|-----|
| C+M | C+M | K   | C+M | C+M |

FIG. 4

HIGH RESOLUTION SCALABLE GLOSS EFFECT

BACKGROUND

Security is an important concern in the realm of documents and digital production and/or reproduction of same. Known digital image printing/copying systems produce documents of such high quality that a need has been identified to prevent effective printing/copying of certain documents such as high-value printed items including tickets, financial instruments, security passes, and the like. Known techniques include printing the original document in a manner such that it includes a digital "watermark" using only conventional paper and toner or ink. A digital watermark in a broad sense can be defined as information, for example one or more letters, words, symbols or patterns, that is at least partially (preferably fully or at least substantially) hidden in a printed image under normal viewing conditions but that is more clearly discernable under certain specialized viewing conditions. Unauthorized reproduction of documents including such digital watermarks typically degrades or obscures the digital watermark, which can aid in detection of counterfeit documents.

FIG. 1 is a simplified enlarged illustration of a conventional halftone gloss mark GM structure that is one type of known digital watermark that can be defined and created using only standard materials, i.e., conventional ink/toner colorants (e.g., cyan, magenta, yellow and black) and conventional media such as printing or "copy" paper. The gloss mark GM includes a gloss mark object GO such as one or more characters, symbols, patterns or the like (shown in FIG. 1 as an italicized "A") defined in a printed document D against a background GB of the same color, wherein the gloss mark object GO and background GB are defined using respective first and second anisotropic halftone dot structures. When the document D is viewed straight-on (i.e., with the line of sight being at least generally orthogonal to the paper or other media on which the document D is printed) or when the document D is scanned for copying on a conventional image reproduction apparatus, the first and second halftone structures of the gloss mark object GO and background GB are perceived or sensed to be a substantially uniform color halftone area. If the printed document D is viewed at an oblique angle, however, there will be a significant difference in the light reflected from the respective first and second halftone structures of the gloss mark object GO and background GB, which will allow the gloss mark object GO to be readily perceived by a human viewer. As such, any attempt to produce a counterfeit of the original document via scanning and reproduction will degrade or obliterate the gloss mark because the image reproduction apparatus will not accurately distinguish between the different halftone structures GO,GB.

For real world applications, these known halftone gloss marks GM can be printed with any one of a wide variety of different colors but require that the gloss mark object GO have a certain minimum size of about 24 points or larger (where 1 point=$1/72$ of an inch), based upon the spatial requirements of the first and second anisotropic halftone dot structures. Also, a halftone gloss mark object defined at a certain point size cannot simply be scaled to a new font size. Instead, the gloss mark object must be defined for each different size. Furthermore, these halftone gloss marks must also be sized in integer multiples of pixels/lines. As such, it has been deemed desirable to provide a method and apparatus for producing a high resolution and scalable gloss effect that overcomes these and other limitations of halftone gloss marks.

SUMMARY

In accordance with one aspect of the present development, a method for defining a gloss effect in a printed document includes printing a document region with first and second colorant combinations. The first colorant combination defines a first colorant stack height and said second colorant combination defines a second colorant stack height that differs from the first colorant stack height. As such, the document region has a first appearance when viewed straight-on and a second appearance when viewed at an angle.

In accordance with another aspect of the present development, a printed document has a substantially solid color region including first and second colorant combinations. The first colorant combination defines a first colorant stack height and the second colorant combination defines a second colorant stack height that differs from the first colorant stack height. The document region has a first appearance when viewed straight-on and a second appearance when viewed at an angle.

In accordance with another aspect of the present development, a method of defining a gloss mark object in printed document includes printing toner on paper to create a substantially solid color region. The solid color region is defined by first and second toner stacks having respective first and second heights, wherein the first and second toner stacks define respective first and second colors that are substantially indistinguishable from each other when viewed at a first viewing angle by a human observer. The first and second toner stacks are arranged relative to each other to define a gloss mark object that is more visible when the solid color region is viewed at second viewing angle as compared to when the solid color region in viewed at the first viewing angle.

BRIEF DESCRIPTION OF DRAWINGS

The development comprises various steps and/or components and/or arrangements of same, embodiments of which are illustrated in the accompanying drawings that form a part hereof, wherein:

FIG. 4 represents a top view of a document region printed in accordance with another alternative embodiment, where the areas of lower stack height and higher stack height are created with alternative colorant combinations.

DETAILED DESCRIPTION

Figure 1:
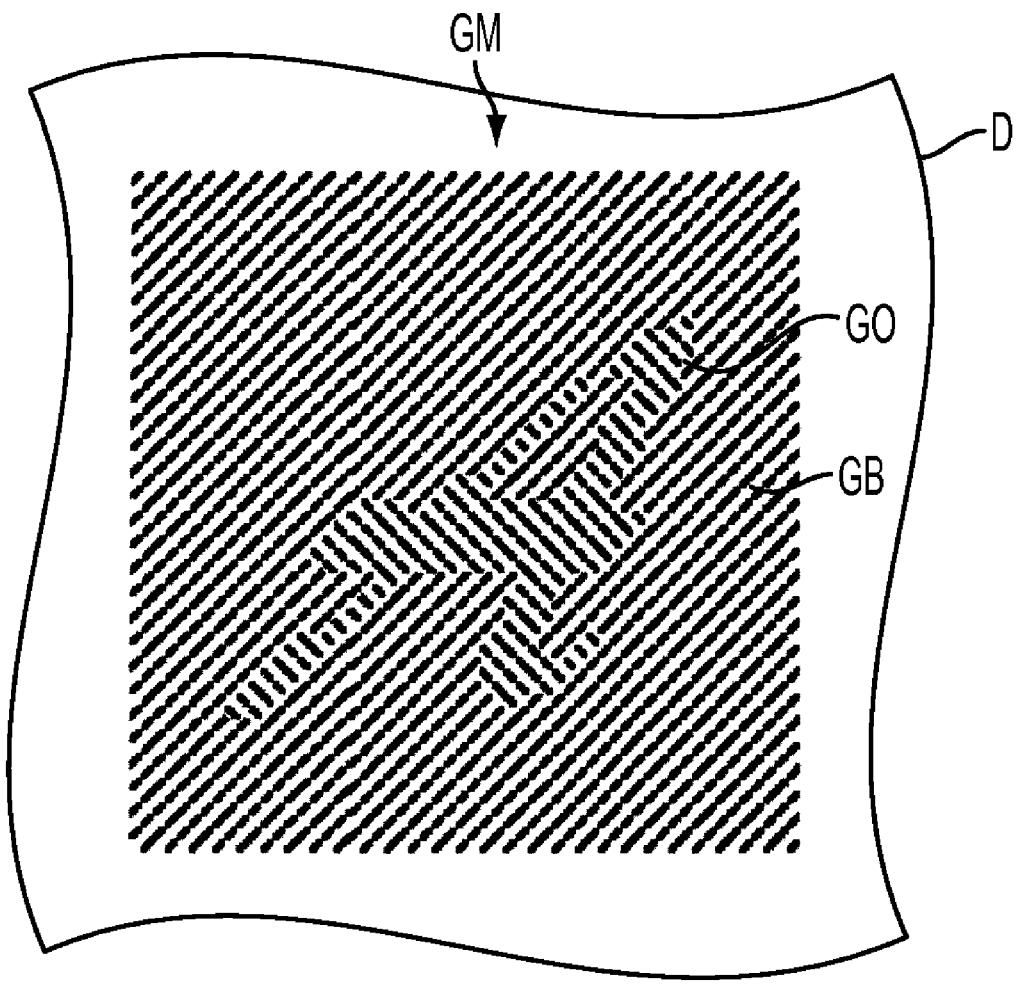
FIG. 1 (prior art) is a simplified and enlarged representation of a conventional gloss mark defined using first and second anisotropic halftone dot structures.
Figure 2A:
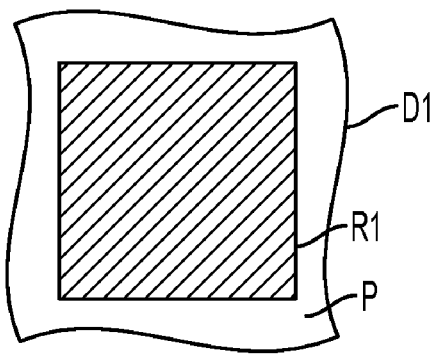
FIGS. 2A and 2B (prior art) illustrate a document printed with a solid color region as viewed straight-on and at an angle, respectively.
Figure 2B:
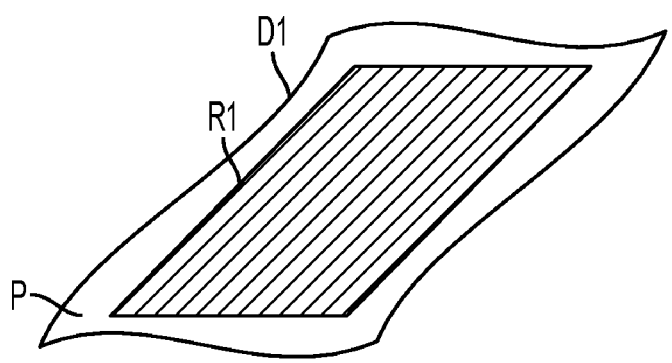
Figure 2C:
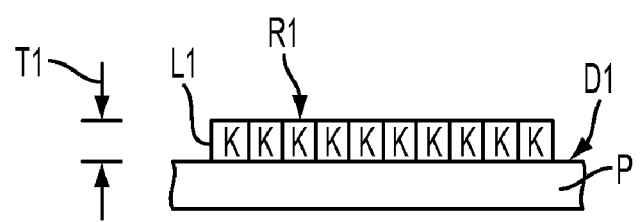
FIG. 2C (prior art) is a greatly enlarged, simplified section view of FIG. 2A.

FIGS. 2A and 2B illustrate a conventional document D1 printed with a solid color region R1 as viewed straight-on and at an angle, respectively. The solid color region R1 is a "dark"

region, meaning that it is colored using black colorant (K) throughout or it is colored using a mixture of cyan (C), magenta (M) and yellow (Y) colorants throughout that cooperate to define a dark color. It can be seen in FIG. 2C, which is a section view through the document D1, that the black colorant deposited on the paper P or other media, defines a layer L1 of uniform thickness T1. Alternatively, the layer L1 can be defined from a mixture of cyan, magenta, and yellow colorants that define a layer L1 to have a uniform thickness. Although the colorant layer L1 is shown diagrammatically in FIG. 2C as being defined by rectangular blocks, it should be recognized that the colorant layer L1 will typically be defined by rounded mounds of colorant in a printed document D1, e.g., by fused toner.

Figure 3A:
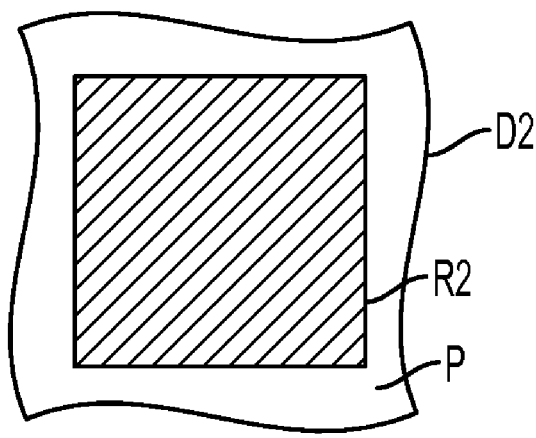
FIGS. 3A, 3B, 3C correspond respectively to FIGS. 2A, 2B, 2C, but show a printed document printed in accordance with the present development.

FIG. 3A shows a document D2 printed with a solid color region R2 in accordance with the present development. When viewed straight-on or approximately straight-on as shown in FIG. 3A (e.g., with the line of sight being substantially orthogonal to the plane of the document D2), the solid color region R2 has a uniform color appearance over its entire surface area. Likewise, when scanned in an image reproduction apparatus, the solid color region R2 will be sensed to have a uniform color over its entire surface area, and any resulting copy will thus be printed with a conventional solid color region as discussed above in connection with FIGS. 2A and 2B. When the solid color region R2 of document D2 is viewed at an oblique angle, however, as shown in FIG. 3B, a gloss effect such as a gloss mark object can be perceived (the gloss mark object is shown in FIG. 2B as an "X").

Figure 3B:
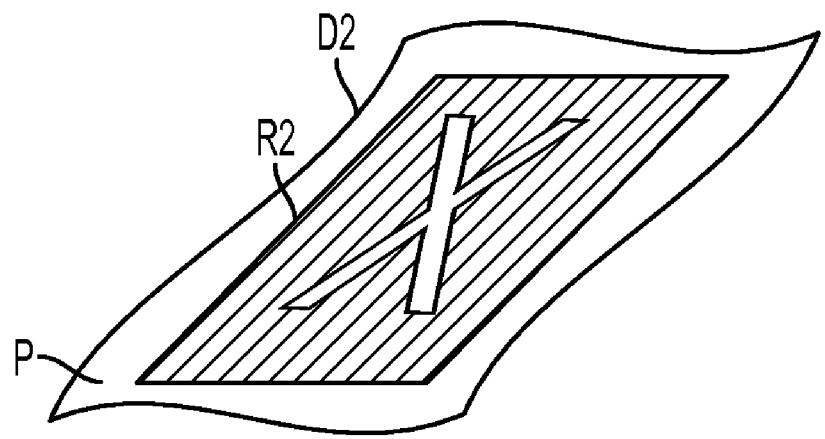
Figure 3C:
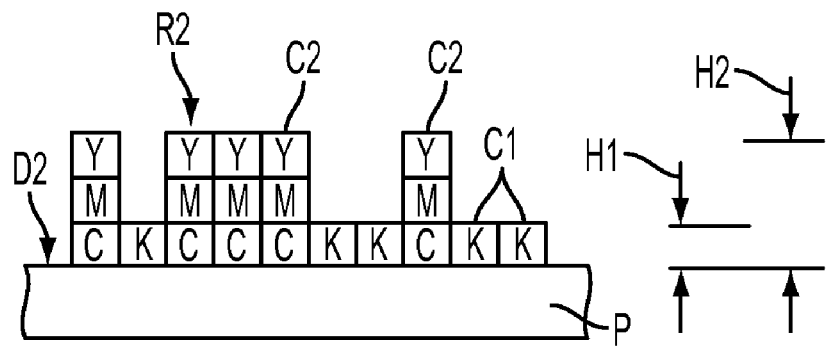

The gloss effect of FIG. 3B results from printing the substantially solid color region R2 with a combination of first and second colorant combinations C1,C2 that have a similar color as perceived by a human observer, but that exhibit respective first and second physical thicknesses or colorant stack heights H1,H2 when deposited on paper or another substrate/media as shown in FIG. 3C. Although the colorant stacks H1,H2 are shown diagrammatically in FIG. 3C as being defined by rectangular blocks, it should be recognized that the stacks H1,H2 will typically be defined by rounded mounds of colorant in a printed document D2, e.g., by fused toner. Those of ordinary skill in the art will recognize that the term "colorant combination" is intended to encompass a single colorant or multiple colorants. The first and second colorant combinations C1,C2 are at least an approximate metameric colorant pair, meaning that the different colorant combinations C1,C2 define colors that are perceived by most people to have substantially the same average color and luminance when viewed at a first viewing angle or condition (e.g., straight-on viewing of the of the document D2 as represented in FIG. 3A where the line of sight is at least approximately orthogonal to the plane of the printed document D2) but are perceived to have different average color and/or luminance under a second viewing angle or condition (e.g., when viewing the document D2 at an oblique angle as represented in FIG. 3B). In particular, when the document D2 is viewed at an angle as represented in FIG. 3B, light incident on the solid color region R2 reflects differently from the respective colorant combinations C1,C2 owing to their different colorant stack heights H1,H2. When the document D2 is viewed straight-on as represented in FIG. 3A, the difference in colorant stack heights H1,H2 is substantially or completely imperceptible such that the solid color region R2 appears to have a flat surface with a uniform color. Likewise, a scanner of an image reproduction apparatus cannot detect the difference in colorant stack heights H1,H2, and any resulting reproduction of the original document D2 will include only a conventional solid color region R1 as shown in FIGS. 2A and 2B. Dry toner is one example of a colorant that can be used to define the colorant combinations C1,C2 such that the different colorant stack heights can be achieved.

Those of ordinary skill in the art will recognize that the present development requires that the colorant combinations C1,C2 be "dark" colors, but not necessarily black, because of the need to provide a metameric match and also a difference in colorant stack heights H1,H2. In the example of FIG. 3C, the colorant combination C1 comprises only black colorant as defined by a one-level colorant stack K, and the colorant combination C2 comprises cyan, magenta, and yellow colorants as defined by a three-level colorant stack CMY. Both colorant combinations C1,C2 will define a color that will be perceived as black to a human observer and, thus, the colors defined by the colorant combinations C1,C2 provide a metameric pair as defined herein. Both colorant combinations C1,C2 are deposited on the paper P or other media in a single pass, without any need to re-feed the paper. Other colorant combinations C1,C2 are possible. In one alternative, if a spot color such as orange is available in a printer, C1 can be defined by the spot orange and C2 can be defined by CMYK orange.

In accordance with the present development, selective placement of the first and second colorant combinations C1,C2 on the paper or other recording media allows a gloss mark object to be defined in a wide variety of shapes and sizes such that the gloss mark object is scalable and high-resolution and suitable for defining variable data gloss mark objects. For example, it is possible to define a scalable gloss mark font at any desired size, including sizes of 3 points or less. Also, the gloss effect in accordance with the present development can be implemented through a "pattern ink" wherein bitmaps of gloss mark effects or patterns are predefined and selected as needed during printing to define a desired gloss mark object. Those of ordinary skill in the art will recognize that the desired gloss mark font or other gloss mark object(s) can be defined by either the shorter colorant stacks H1 with the background being defined by taller colorant stacks H2, or the gloss mark object(s) can be defined by the taller colorant stacks H2 with the background being defined by shorter colorant stacks H1.

Figure 3D:
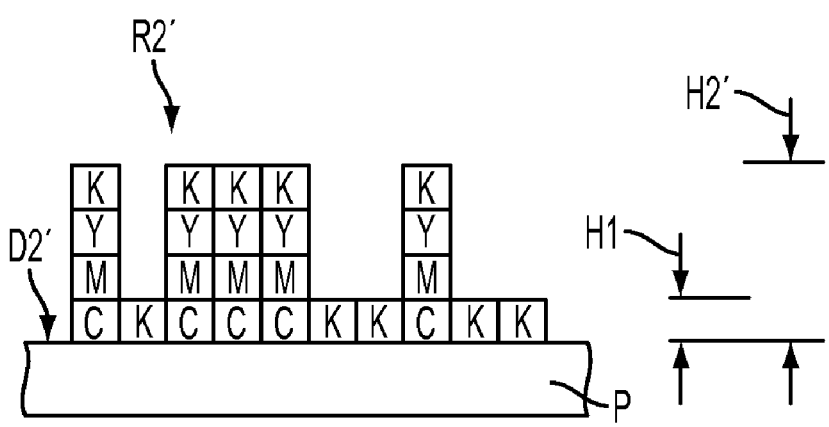
FIG. 3D shows a printed document printed in accordance with an alternative embodiment of the present development.

FIG. 3C shows a colorant stack height differential between the second stack height H2 and the first stack height H1 of 3:1. Those of ordinary skill in the art will recognize that the relative size differential between the colorant stacks H1,H2 can vary without departing from the overall scope and intent of the present development. A colorant stack height differential of 2:1 or greater is acceptable (e.g., 2.1:1 or 2.5:1) and can be accomplished, for example, by reducing the overall height H2 of the CMY colorant stack C2 while still including all three colorants in order to color-match the black colorant K of the first colorant combination C1. It is clear, that FIG. 3D shows another example of a solid color region R2' that is identical to the solid color region R2, except that the colorant combination C2 further includes black (K) colorant such that the colorant stack height differential between the stack heights H2' and H1 is 4:1 while still providing a metameric color pair. It is understood that any stack height ratio is an average over the different stack height differentials at all involved locations in the mark, thus fractional stack height ratios are explicitly understood. It is also understood that most machines will not allow certain colorant coverages and thus inherently limit the stack ratios. The preferred stack height differential is a function of the actual output device and in the case of for example, a Xerox DocuColor is on the order of 2.6 to 1.

Figure 4:
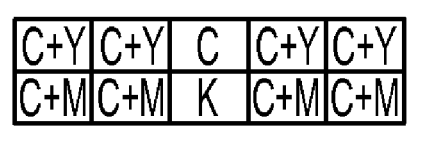

Another optional method is shown in FIG. 4, here a top view is shown where the area of lower stack height is created by alternating black (K) and cyan (C) areas as the first colorant mixture or combination. The higher stack second colorant mixture or combination comprises alternating blue (C+M) and red (C+Y) colorant areas, thus being an example of the above mentioned 2:1 height ratio. Note that the overall color of the patch or region defined in FIG. 4 is a mixture of black and cyan that fulfills the boundary condition of being sufficiently dark to create a metameric or approximate metameric match so that the region will appear to have a substantially constant dark color throughout. Note also, that—especially in xerographic printing—most colorant combinations implicitly include a spatial distribution associated with it, and that these distributions are to be within the scope of this description. For example, a 80% "black" will be done by a spatial distribution of either black (K) toner and white paper, or by a spatial distribution of C, M, and Y toner along with preferably less white paper. The basic underlying principle of the description being that the average stack height of the two metameric colorant combinations is decidedly different.

The above gloss effect method can implemented on any conventional digital color xerographic apparatus using standard colorants and paper or other media.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for defining a gloss effect in a printed document, said method comprising:
  printing a solid color document region on paper using a first colorant combination that defines a gloss mark object of said solid color document region and using a second colorant combination that defines a background of said solid color document region, wherein said first and second colorant combinations are a metameric color pair such that said gloss mark object and said background together define said solid color document region to have a uniform single color appearance over an entire surface area of said solid color document region, said first colorant combination defining a first colorant stack height on said paper and said second colorant combination defining a second colorant stack height on said paper, wherein said second colorant stack height is greater than said first colorant stack height by a colorant stack height differential of at least 2:1 such that said gloss mark object and said background comprise respective first and second physical thicknesses of toner on said paper and said solid color document region has a first appearance when viewed straight-on and a second appearance when viewed at an angle.

2. The method as set forth in claim 1, wherein said second colorant stack height is greater than said first colorant stack height by a colorant stack height differential of at least a 2.5:1.

3. The method as set forth in claim 2, wherein said first colorant combination comprises only black colorant.

4. The method as set forth in claim 1, wherein said step of printing a solid color document region on paper using a first colorant combination that defines said gloss mark object of said solid color document region and using a second colorant combination that defines said background of said solid color document region comprises:
  printing said gloss mark object in the shape of a font character having a size of 3 points or less.

\* \* \* \* \*